United States Patent [19]

Farrall

[11] Patent Number: 5,656,921

[45] Date of Patent: Aug. 12, 1997

[54] CONTROL OF A VEHICLE POWERTRAIN

[75] Inventor: Simon David Farrall, Coventry, England

[73] Assignee: Rover Group Limited, Birmingham, England

[21] Appl. No.: 443,583

[22] Filed: May 17, 1995

[30] Foreign Application Priority Data

May 24, 1994 [GB] United Kingdom ............ 9410389

[51] Int. Cl.$^6$ ........................... H02P 9/04
[52] U.S. Cl. ................. 322/40; 322/9; 322/38; 180/65.2
[58] Field of Search ................. 322/9; 180/65.2, 180/165; 290/16; 60/716, 718

[56] References Cited

U.S. PATENT DOCUMENTS

| | | | |
|---|---|---|---|
| 4,282,947 | 8/1981 | Kemper | 180/165 |
| 4,335,429 | 6/1982 | Kawakatsu | 364/424 |
| 4,407,132 | 10/1983 | Kawakatsu et al. | 60/716 |
| 4,533,011 | 8/1985 | Heidemeyer et al. | 180/65.2 |
| 5,081,365 | 1/1992 | Field et al. | 290/45 |
| 5,343,970 | 9/1994 | Severinsky | 180/65.2 |
| 5,389,050 | 2/1995 | Sakai et al. | 477/78 |
| 5,390,117 | 2/1995 | Graf et al. | 364/424.1 |
| 5,487,007 | 1/1996 | Suzuki et al. | 364/424.05 |

FOREIGN PATENT DOCUMENTS 0570242  11/1993  European Pat. Off. .
2267364  12/1993  United Kingdom .

Primary Examiner—Steven L. Stephan
Assistant Examiner—Nicholas Ponomarenko
Attorney, Agent, or Firm—Davis and Bujold

[57] ABSTRACT

A controller 20 for a vehicle powertrain, the powertrain comprising an electric motor 16 powered by a battery and an engine 14 powered by fossil fuel. The engine 14 is typically an internal combustion petrol engine. The controller 20 is operative to use maps stored in memory to control the torque contributions from the engine and the motor so as to maintain a desired relationship between the contributions of the electric motor 16 and the engine 14 towards the powering of the vehicle, and the controller is adaptive in that it is arranged to adapt said maps by altering one or more values stored therein to obtain a desired relationship.

24 Claims, 4 Drawing Sheets

_5,656,921_

CONTROL OF A VEHICLE POWERTRAIN

FIELD OF THE INVENTION

The invention relates to the control of a vehicle powertrain.

BACKGROUND OF THE INVENTION

Emissions regulations which must be met by vehicles are becoming increasingly strict. In order to meet these increasingly strict regulations, it is felt that, in the future, something other than a conventional internal combustion engine vehicle will be required.

One suggestion that might meet this requirement is a hybrid vehicle which is powered by a combination of an internal combustion engine and an electric motor. An additional factor motivating the use of hybrid vehicles is the suggested zero emission zone which might be used in city centres to reduce acute urban pollution. A hybrid vehicle could meet the requirements of the zero emission zone within the city and yet still have sufficient acceleration and range to allow its use outside urban areas.

Having designed a hybrid vehicle, there is a need to establish the way in which the powertrain of the vehicle should be used. The term "powertrain" means the engine and drive transmission by means of which power is transmitted to drive the vehicle. Under some circumstances, one method of operating the powertrain will be obvious. For instance, when a hybrid vehicle is used for a long motorway journey, the electric part of the powertrain will be unable to make a useful contribution because of the amount of power and energy required. Conversely, in a zero emission zone, the internal combustion engine can make no contribution. However, there are potentially two other ways in which the powertrain of the vehicle could be used. The power for propelling the vehicle could be drawn partly from the internal combustion engine and partly from the electric motor. That would have the advantage of being less emissive and cheaper than using the internal combustion engine alone. A further method might be to use the electric motor to oppose the internal combustion engine of the vehicle, in order to increase the state of charge of the battery used to power the electric motor. That might be useful when approaching a zero emission zone with a depleted battery.

The first two categories mentioned above will not require any large increase in complexity since the drive arrangements will be similar to those of conventional internal combustion engine vehicles and electric vehicles respectively. The second two methods of operation will require the separate actions of the engine and the electric motor to be combined and one object of the present invention is to provide a suitable controller for that purpose so that the driver does not have to control the electric motor and the engine individually.

SUMMARY OF THE INVENTION

According to one aspect of the invention there is provided a controller for a powertrain, the powertrain including an electric motor powered by an electrical power source and an engine powered by combustible fuel, the controller comprising means for measuring the performance of the powertrain with respect to a desired relationship between the contributions of each of the motor and engine, the controller being operative to maintain the desired relationship and further comprising means for providing the controller with means to adapt stored memory maps by replacing stored values therein with altered values in response to the measurement of said performance of the powertrain with respect to the desired relationship between the contributions of each of the motor and engine.

According to another aspect of the invention there is provided a method of controlling a powertrain using a controller as set out in the immediately preceding paragraph including the steps of:

a) measuring the powertrain performance and b) adjusting the powertrain controller accordingly.

BRIEF DESCRIPTION OF THE DRAWINGS

Control of a vehicle powertrain in accordance with the invention will now be described by way of example with reference to the accompanying drawings in which.

DETAILED DESCRIPTION OF THE PREFERRED EMBODIMENTS

Figure 1:
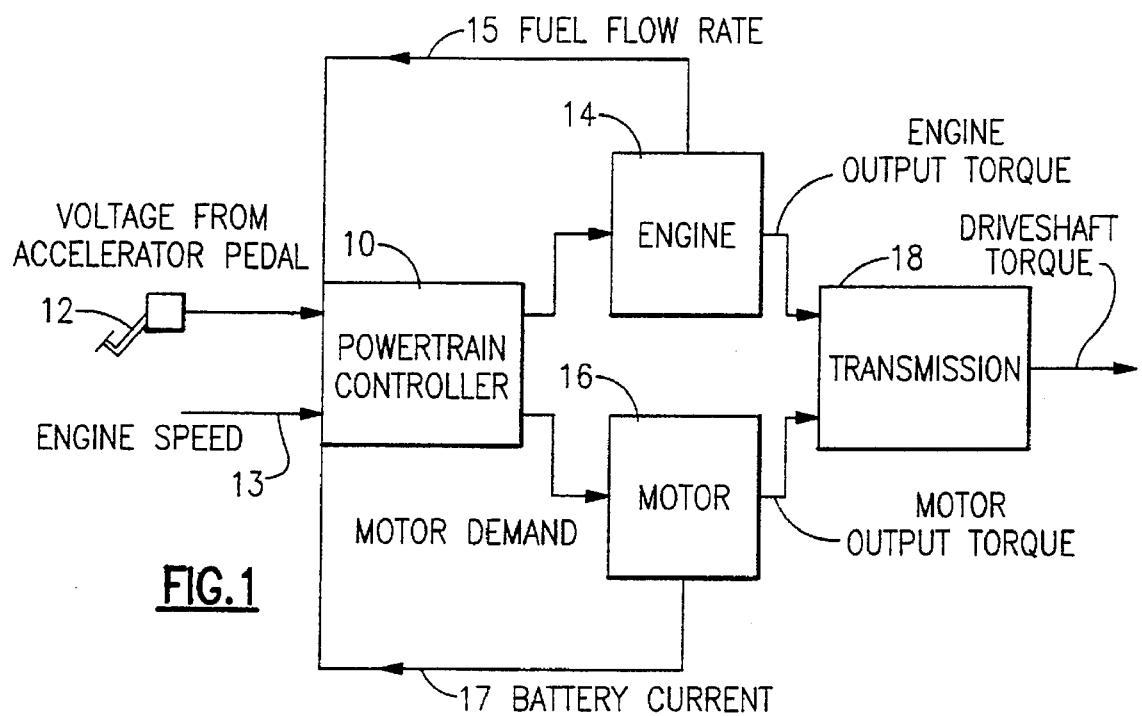
FIG. 1 is a schematic block diagram showing the form of the powertrain and the role of the powertrain in a hybrid vehicle.

In FIG. 1 a powertrain controller 10 is provided which is used to interpret movements of an accelerator pedal 12 of an internal combustion engine 14 and, using engine speed, generate a throttle angle demand signal for the engine 14 and an armature current demand signal for an electric motor 16. Torque is delivered by the engine 14 and the motor 16 to a transmission of a vehicle.

Other electric motor demand signals could be used dependent upon the type of the electric motor and the way in which the electric motor operates. It should be noted, in passing, that a vehicle having this particular arrangement of the internal combustion engine and the electric motor is known as a parallel hybrid vehicle. This is because there are parallel paths for the fuel and electrical energy to reach the wheels of the vehicle. An alternative type of hybrid vehicle is known as a serial hybrid vehicle, in which the energy from the internal combustion engine passes through electrical machines to reach the wheels of the vehicle.

A feature of the arrangement of FIG. 1 is that the powertrain controller 10 observes the engine fuel flow rate and the battery current via signals 15 and 17 respectively, whilst the output torques of the internal combustion engine 14 and electric motor 16 cannot be measured.

The powertrain controller 10 is implemented using fuzzy logic. A detailed understanding of fuzzy logic is not required in order to appreciate the manner in which the basic hybrid powertrain controller 10 works. As stated above, the controller 10 has two pieces of input information derived from movement of the accelerator pedal 12 and engine speed from engine speed input 13 and generates two pieces of output information, the demanded throttle angle which is delivered to the engine 14 and the demanded electric motor armature current or equivalent electric motor load demand signal which is delivered to the motor 16. Fuzzy logic can be thought of as a method of interpolating between fuzzy sets. A fuzzy set is a method of representing vaguely defined quantitative notions such as "a medium amount of throttle angle". A fuzzy controller can be constructed by combining a number of such sets using fuzzy rules. If the sets are of a particular form, and they are combined as rules in a particular way, the input-output relationship for the controller 10 reduces to linear interpolation between the points that are used to define the fuzzy sets. In effect, this is equivalent to the use of maps in engine management systems. Such maps relate one dependent variable to one or more independent variables. An example might be the ignition timing map which relates the ignition timing (the dependent variable) to the engine load and speed the independent variables).

In the controller 10 there are two output variables, which might be referred to as dependent variables. There are, therefore, two maps which relate the dependent variables of demanded throttle angle and demanded armature current to the independent variables of pedal value and engine speed.

Figure 2A:
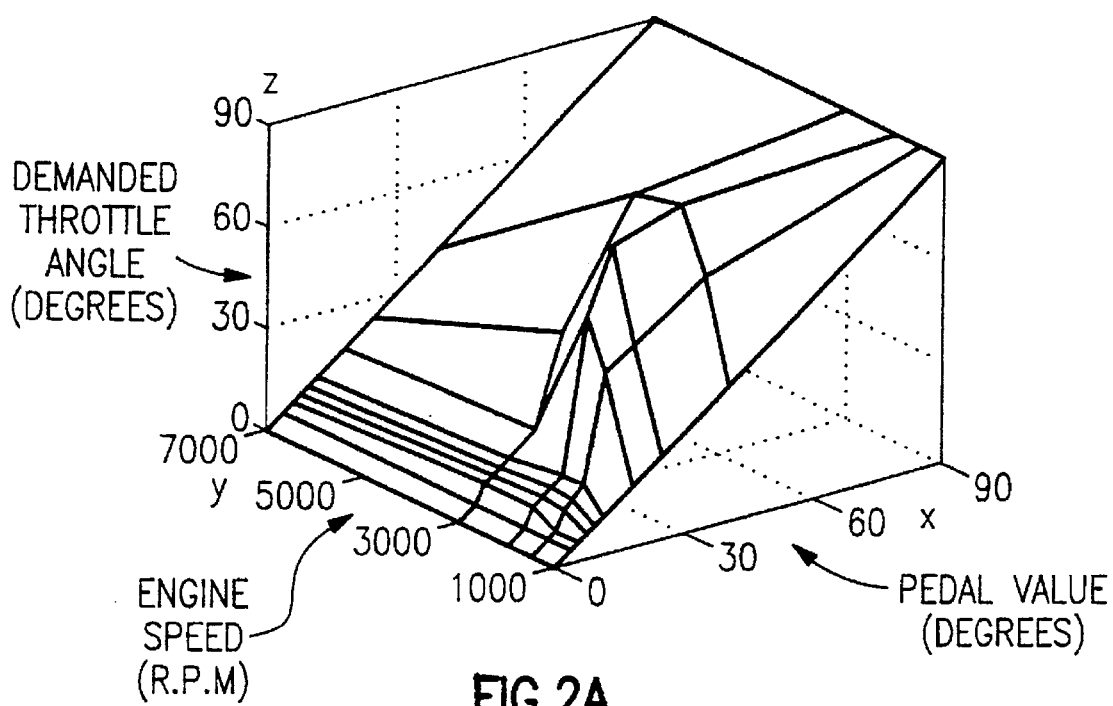
FIG. 2 shows an example of the maps used to control the powertrain.
Figure 2B:
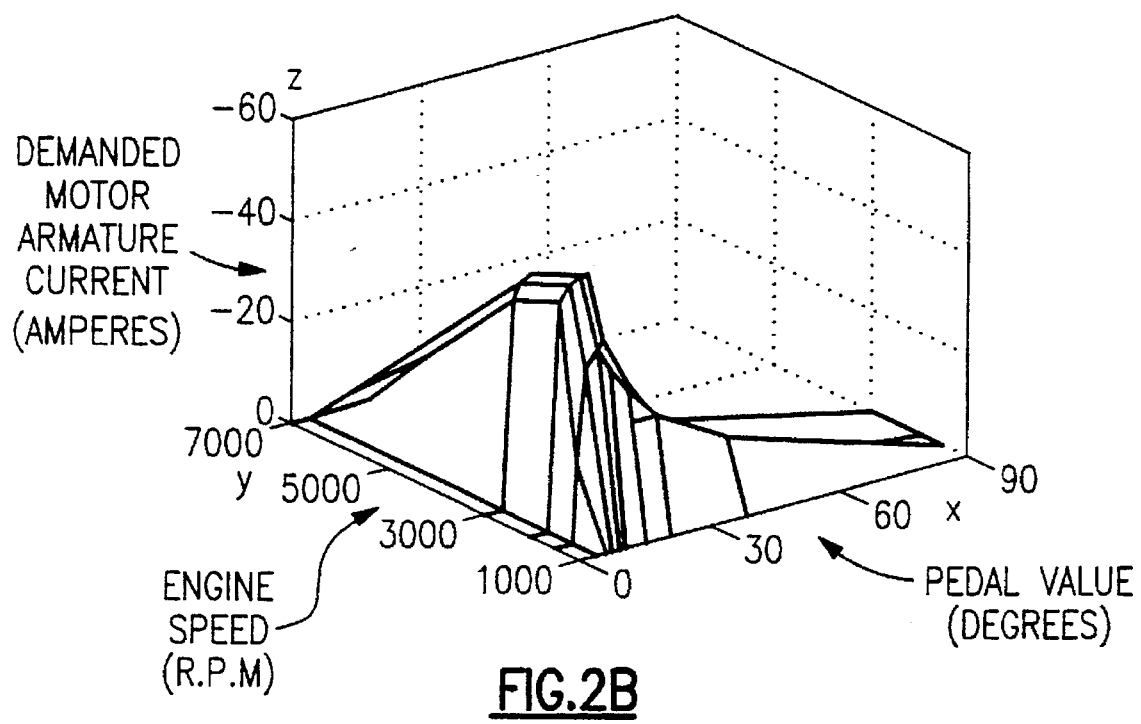

FIG. 2 shows an example of the two maps used in the powertrain controller 10. The left hand map (i) plots pedal value on the x-axis and engine speed in revolutions per minute on the y-axis against demanded throttle angle in degrees on the z-axis. The right hand map (ii) plots pedal value on the x-axis and engine speed in revolutions per minute on the y-axis against demanded motor armature current in Amperes on the z-axis. The maps would be used in the mode of operation in which the electric motor 16 opposes the action of the internal combustion engine 14. It is seen that, where the electric motor 16 generates relatively large negative armature currents, the throttle angle is increased to maintain the powertrain torque output.

The dimensions of the maps used would normally be in the order of 5 to 20 points, by 5 to 20 points and, for example, a 5 by 13 array of values can constitute such a map.

Figure 3:
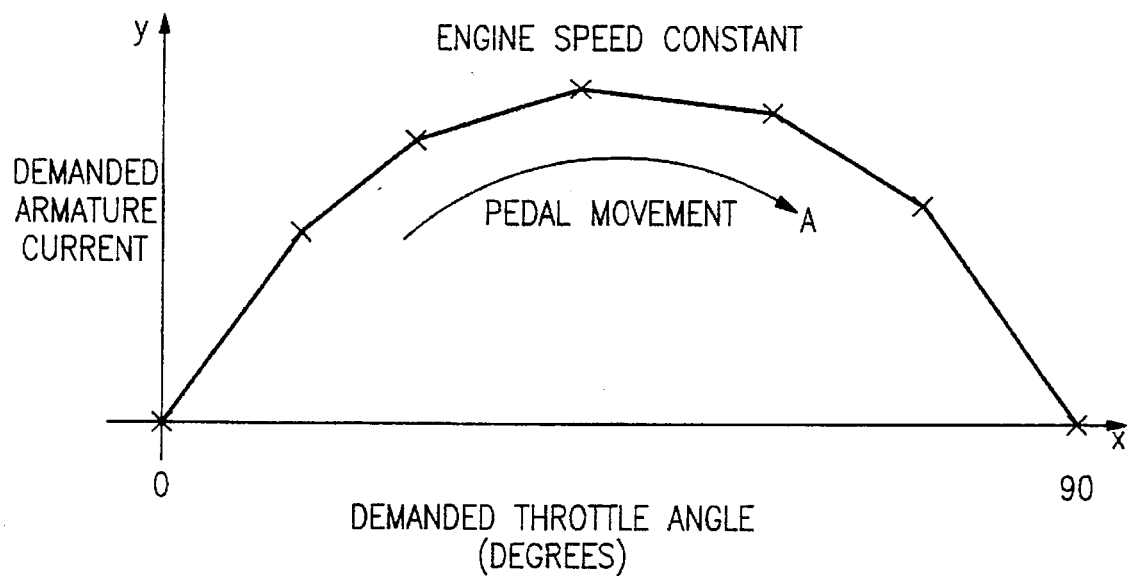
FIG. 3 is a graph of the relationship between throttle angle and demanded armature current as pedal value increases with engine speed held constant.

The effectiveness of operation of controller 10 is determined by the relationship between the throttle angle and the demanded armature current. An example of this relationship is shown in FIG. 3, in which the engine speed is constant and the throttle angle is plotted along the x-axis against the demanded armature current on the y-axis as the pedal value varies indicated by arrow A. The crosses in FIG. 3 represent the points through which the linear interpolation passes and are, when the fuzzy logic is implemented in the manner referred to above (Page 6 Lines 15–26) the points which define the fuzzy sets in the hybrid powertrain controller. FIG. 3 indicates that the relative position of the fuzzy sets that define the engine throttle angle and the demanded armature current define the operation of the combined powertrain. For zero movement of pedal 12, the engine throttle angle should be zero and the electric motor currents should also be zero (engine throttle angles are measured relative to the idle throttle angle since clearly, at idle, the throttle angle is not zero). When the pedal is fully depressed the throttle angle is 90° and, again, the electric motor currents are zero. This gives the vehicle the same maximum acceleration or top speed during hybrid operation as in internal combustion engine only operation. Clearly this is not the maximum acceleration or top speed of the vehicle since the electric motor 16 could be used to assist the internal combustion engine 14 if desired.

The points defining the throttle angle and armature current fuzzy sets, define how the powertrain will generate torque. If those points have incorrect values then the powertrain will not generate the correct amount of torque leading to potential problems in the driveability of the vehicle. The traditional fuzzy logic design approach uses the knowledge and engineering intuition of a design engineer to place and shape the fuzzy sets. However, when that approach was used in the design of the hybrid powertrain controller of the present invention it proved difficult to design controllers that produced sensible, consistent output torques. Additionally, the traditional fuzzy design approach does not allow the relative use of the electrical energy stored in the batteries of the vehicle and the fossil fuel to be easily controlled. To improve the powertrain output torque generation and to control the relative use of the energy resources of the vehicle the following steps were taken in accordance with the present invention.

Figure 4:
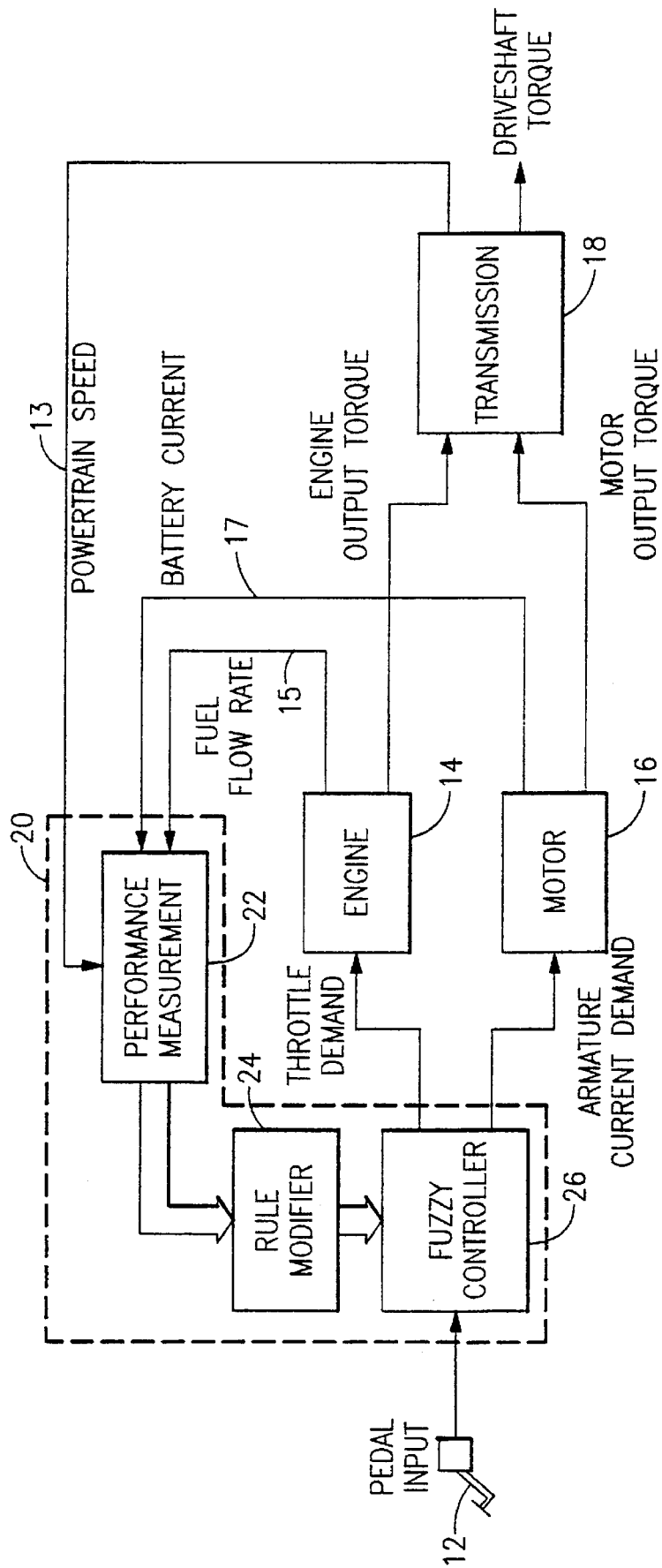
FIG. 4 is a schematic diagram of an adaptive fuzzy hybrid powertrain controller; and, FIG. 5 shows a plot of instantaneous performance measure of the powertrain in terms of its ability to use the energy resources to the vehicle in a desired ratio over time with two corresponding plots of moving average estimates over time.

As shown in FIG. 4, which shows the operation of the powertrain controller (indicated at 20) in block diagram form, the powertrain controller has a control unit 26 and two additional functional blocks 22,24 that are not present in the basic powertrain controller 10 shown in FIG. 1. The operation of these two blocks, (a performance measurement block 22 and a rule modifier block 24) will be considered separately below.

Figure 5A:
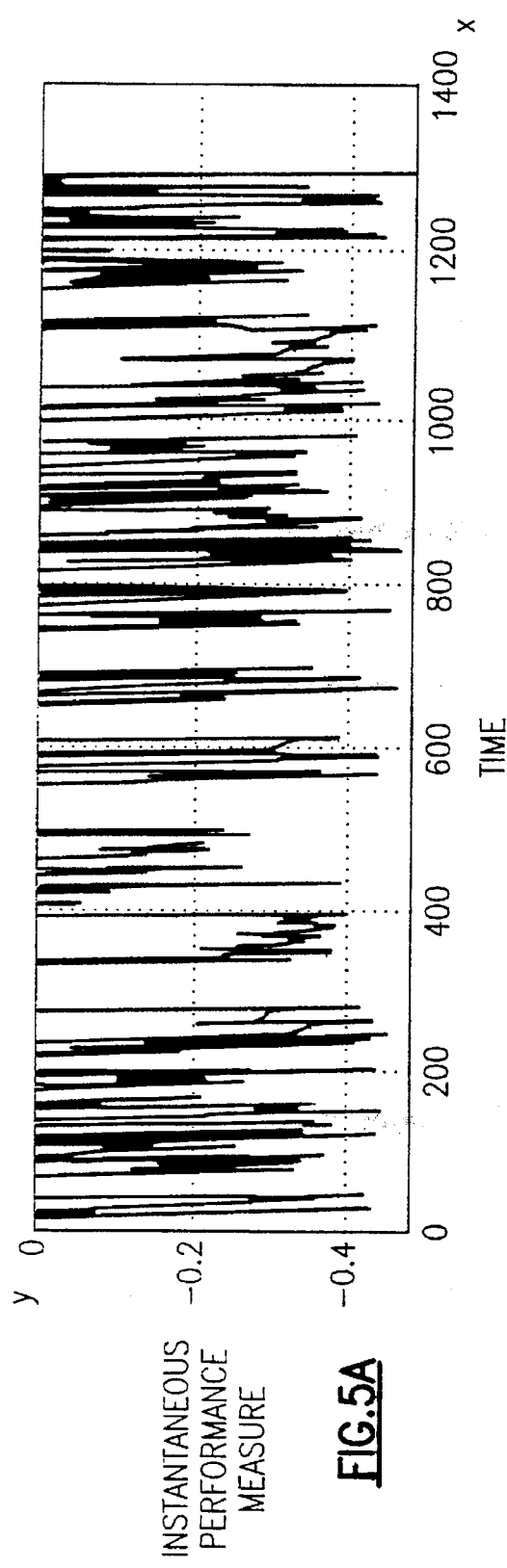
Figure 5B:
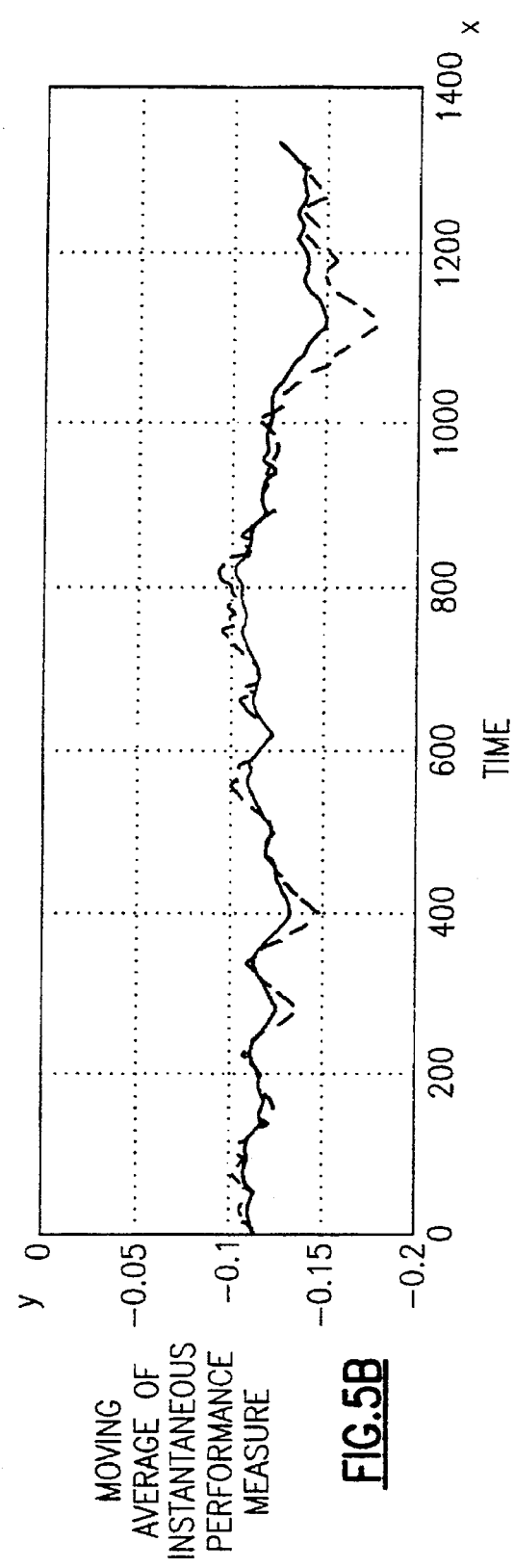

The performance of the powertrain in terms of its ability to use the energetic resources of the vehicle in a desired ratio can be measured using a function such as $$F = I_{bat}/(k_e \dot{m}_f)$$

in which $I_{bat}$ is the battery current drawn by the electric motor, $\dot{m}_f$ is the internal combustion engine fuel flow rate and $k_e$ is a constant that defines the equivalence of fuel and electrical energy. In FIG. 5, the upper plot shows the instantaneous values of the performance measure for a controller 20 along the y-axis against time on the x-axis, which causes the electric motor 16 to work against the internal combustion engine 14 being used in a simulation of an urban route. As can be seen from the upper plot of FIG. 5 the instantaneous values of this performance measure vary enormously and give little indication of the performance of the vehicle in general. For this reason a moving average estimate of the performance measure, $\overline{F}$ is used and is calculated as follows $$\overline{F}_n = \overline{F}_{n-1} \frac{(v-1)}{v} + F \frac{1}{v}$$

where $\overline{F}_n$ is the moving average value of the instantaneous performance measure, F, at time index n. The parameter $v$ can be used to adjust the rate at which the average is influenced by new information. The lower plot of FIG. 5 shows the moving average value along the y-axis against the same x-axis as in the upper plot.

By way of example, the solid line in FIG. 5 is derived for $v=5000$ in the above equation, whilst the dashed line is derived for $v=2500$.

The fuzzy rules are repeatedly modified after a period of time called herein the adaptation interval, $T_a$ which can be 50 seconds for example. As mentioned above the powertrain controller can be reduced to the form of maps of throttle angle and demanded armature current over the independent variables of engine speed and pedal movement value. Vectors of engine speed and pedal movement value are used to define a grid in which the controller output variables of the powertrain controller 20 are stored. The powertrain controller 20 uses the pedal movement value and the engine speed to calculate a new throttle angle and a new demanded armature current. This calculation can be carried out every 0.1 second, which is called herein the controller sampling interval. Associated with the controller output maps is an array of counters the same size as the controller output maps. At each controller sampling interval the nearest point to the current operating point on the grid over which the controller output map is defined is identified. The corresponding element in the counter array is then incremented. These counters are reset after each adaptation interval. If, during an adaptation interval, the counter corresponding to a particular location on the grid is equal to or greater than one, then the fuzzy rule which corresponds to this counter is termed "a modification driving fuzzy rule" and if the counter is zero the fuzzy rule is termed "a modification following fuzzy rule." The two types of rules are modified differently. It will be appreciated that a threshold other than one could be used to distinguish between the two types of rules.

When modifying the controller maps, the powertrain output torque should remain constant. This means that, if the throttle angle is reduced, the demanded electric motor armature current should increase. The relative amounts of change that should be made to the controller output variables is defined using information about the internal combustion engine 14 and the electric motor 16. This information defines a direction in FIG. 3 along which the points in the controller maps defined by the crosses in FIG. 3 should move. Regardless of whether the controller output sets are classified as modification drivers or followers, the points represented by the crosses in FIG. 3 are always moved in a direction which maintains the powertrain output torque.

The information about the internal combustion engine and electric motor used to define the direction in which the points in FIG. 3 move, relates the rate of change of engine output torque to throttle angle over all engine speeds and throttle angles, and the rate of change of motor output torque with respect to demanded motor armature current or other motor demand signals over all motor speeds and motor demand signal values. This information is obtained by earlier measurements carried out on the engine and motor in the condition in which they are used in the vehicle.

The crosses representing the driving rules are moved in the direction which maintains a constant powertrain output torque a distance proportional to the difference between a desired value $F_d$ of the performance measure F and the current estimate, $\bar{F}$ of the performance measure. This distance is modified where the shape formed by the crosses in FIG. 3 is not a smooth curve. By enforcing a smooth curve, the controller 20 will gradually vary the use that is made of the two powertrain elements as the driver's pedal is further depressed and this is desirable from a practical point of view since it will tend to maintain the driveability of the vehicle.

The fuzzy rules which have been identified as modification followers during the last adaptation interval are moved such that the smoothness of the overall shape formed by the crosses in FIG. 3 is maintained.

The driving rules strongly influence the basic nature of the shapes formed by the location of the fuzzy output sets, shown by the crosses in FIG. 3, the following rules are moved such that the smoothness of this shape is maintained.

The performance of the controller is determined by the values stored in the controller output maps. Since the modification of the shapes formed by the maps, an example of which is shown in FIG. 3, is driven by the modification driving rules, the shape formed by the crosses in FIG. 3 is determined by the driving rules. The driving rules are identified by the use of the controller 20 over an adaptation interval and, since this use will vary depending upon the driver of the vehicle and the route being driven, the hybrid vehicle powertrain can adapt to use the energy resources of the vehicle in the correct ratio for different drivers over different routes.

The operation of the adapted hybrid vehicle powertrain control system is greatly improved if the value of ν used in the calculation of the moving average $\bar{F}$ is set at relatively low values when the value of $\bar{F}$ is a long way from the desired value $F_d$, and relatively high values when the value of $\bar{F}$ is closer to $F_d$. This improves the responsiveness of the adaptation procedure when $\bar{F}$ is a long way from $F_d$, and it improves the accuracy of the adaptation procedure when F is closer to $F_d$. When a sampling interval of 0.1 s is used, a small value of ν might be 2500 and a large value of ν might be 40000.

A further example of an operable system according to the invention, which specifically uses a fuzzy logic control system is given in the inventor's PhD thesis entitled "A Study in the use of Fuzzy Logic in the Management of an Automotive Heat Engine/Electric Hybrid Vehicle Powertrain", which is available from the University of Warwick, United Kingdom.

Other published hybrid vehicle powertrain controllers have used a fixed control strategy for a powertrain, and the relative use of the energetic resources of the vehicle could not then be adjusted to match the requirements of individual users. Experiments have been performed using data obtained from different drivers over the same urban route. It was found that, due to differences in the way in which the drivers used the vehicle, the adapted controller 20 demanded 30% more armature current for one driver than for the other in order to use the energetic resources of the vehicle in the same ratio. The ability of the controller to adapt to the different driving characteristics between drivers in this manner allows the vehicle performance to meet the requirements of different users.

The adaptive hybrid vehicle powertrain controller 20 could be used in two ways. Firstly it could be used as an engineering development tool for the purposes of developing the controller 20 on prototype vehicles. Secondly, the controller 20 could be used in an adaptive manner on a production hybrid vehicle in service. There are two modes in which both elements of the powertrain are used at the same time. In the mode in which the electric motor 16 acts against the internal combustion engine 16 to increase the battery state of charge, the adaptive hybrid powertrain controller 20 is unlikely to be of a great deal of use in service. This is because this mode might only be used as an "emergency mode" and would not be used frequently enough for the adaptation process to be effective. The adaptation process can be used in developing a fixed controller used in this mode.

Conversely, the adaptive hybrid powertrain controller is very useful in the mode where the electric motor 16 assists the internal combustion engine 14. Many vehicle users have a fixed pattern of vehicle usage which does not vary greatly from day to day. For such users there is a considerable advantage in being able to deplete their battery to a reasonably low, but safe, depth of discharge every day and recharge the battery overnight. The signal $F_d$ can be provided by a potentiometer, or some other device that the user of a vehicle can adjust to bias the actions of the powertrain controller 20 more towards the electric motor 14 or the internal combustion engine 16 of the vehicle. Over a period of a few days the user of the vehicle can adjust the value of $F_d$ so that the desired depth of battery discharge is obtained over daily motoring. Where the user varies the customary usage of the vehicle, a different mode of powertrain operation could be selected.

Regenerative braking by using the electric motor to provide a braking load can be used to generate electric current for charging batteries on the vehicle. Such regenerative braking is likely to be of use primarily in an urban environment where there are likely to be more instances of braking than when driving on non-urban roads.

I claim:

1. A method of controlling a powertrain of a hybrid electric vehicle, the powertrain including an electric motor and an internal combustion engine which supply torque in varying contributions to a transmission, the method comprising the steps of:

a) providing a fuzzy controller utilizing fuzzy logic operating means comprising fuzzy rules;

b) representing a fuel flow rate controlling output and a motor current controlling output as a function of a drive demand input signal and a powertrain speed input signal;

c) using said fuzzy rules to relate the drive demand input signal and the powertrain speed input signal to said outputs;

d) defining a set of input reference points for each input signal which varies over time, said sets together forming an input reference grid;

e) defining an output map over the input reference grid, said map relating each output value to the input values, interpolating within the output map using the input reference grid to obtain an actual output value corresponding to a pair of actual input values;

f) distinguishing driving points in the input reference grid which have a greater effect in powertrain performance, from following points in the input reference grid which have a lesser effect on powertrain performance;

g) adjusting the values in the output map corresponding to the driving points in the input reference map;

h) adjusting the values in the output map corresponding to the following points in the input reference map in order to obtain a desired relationship between said contributions;

i) replacing the actual output value with an altered value corresponding to the adjusted values in steps g) and h).

2. A method according to claim 1 including the steps of providing an array of counters of the same dimension as the input reference grid, and distinguishing the points in the input reference grid as either driving or following points by the following steps:

a) setting each of the counters in the array of counters to zero;

b) monitoring actual input values of the drive demand input signal and powertrain speed input signal;

c) determining the nearest point in the input reference grid to the actual input values;

d) incrementing the counter corresponding to the point determined in step c) above in the array of counters by one for each of the given sampling periods of time that this remains the nearest point to the actual input values;

e) repeating the steps b) and d) for an adaptation interval period of time;

f) defining as driving points those points whose corresponding counters have a value greater or equal to a threshold and all other points as following points;

g) adapting the points in the output maps corresponding to the driving points to modifying the powertrain performance towards the desired powertrain performance and to ensure that the powertrain output torque corresponding to any given value of drive demand and powertrain speed remains substantially constant throughout the process of the controller modification; and h) adapting all the points in the output maps to ensure that as the drive demand and powertrain input speed vary the actions of the engine and the motor vary in a manner that is substantially smooth.

3. A controller for a powertrain where the powertrain comprises a transmission, an internal combustion engine and an electric motor, where the engine and the motor supply torque in a varying contribution to the transmission, a battery providing an energy resource for the electric motor and a fuel supply providing an energy resource for the internal combustion engine;

the controller comprising a measuring means for measuring the ratio in which the fuel supply and the battery are used; and a memory having a plurality of stored maps comprising a plurality of values stored therein with at least one value obtained from the measuring means;

wherein the controller can adapt the maps by updating one or more of the plurality of stored values with one or more altered values to reach a desired relationship between the contributions and then replacing said one or more stored values with said altered values.

4. A controller according to claim 3, wherein the controller is a fuzzy controller operating by means of fuzzy logic to control said contributions.

5. A controller according to claim 4, wherein the controller controls the engine by means of throttle position.

6. A controller according to claim 5, wherein the controller controls the motor by means of the motor current.

7. A controller according to claim 3, wherein the controller is a fuzzy controller which comprises fuzzy rules, the rules relate a drive demand input signal and a powertrain speed input signal to at least one output signal, where the output signal acts to control the contributions.

8. A controller according to claim 7, wherein a set of input reference points is defined for each input over the range over which that varies, said sets together forming an input reference grid.

9. A controller according to claim 3, wherein the measuring means includes smoothing means.

10. A controller according to claim 9, wherein the smoothing means utilises a moving average.

11. A controller according to claim 3, wherein the relative contributions of each of the motor and engine to the powertrain output may be adjusted.

12. A controller according to claim 3 including replenishment means for replenishing the state of charge of the electrical power means with energy supplied by the engine.

13. A controller according to claim 3, wherein the relationship is a ratio between a total energy contribution of the engine and the motor over a particular route.

14. A controller according to claim 3, wherein the relationship is chosen to produce a predetermined depth of discharge of the battery before recharging.

15. A controller according to claim 3, wherein the relationship is between the ratio of the torque contributions and one or more independent variables.

16. A controller according to claim 15, wherein one of the independent variables is the position of an accelerator of the vehicle.

17. A controller according to claim 15, wherein one of the independent variables is the speed of the engine.

18. A controller according to claim 15, wherein the controller adapts the maps so that the relationship between the contributions approximates a smooth curve resulting in efficient driving.

19. A fuzzy logic controller for a powertrain where the powertrain comprises a transmission, an internal combustion engine and an electric motor, where the engine and the motor supply torque in varying contributions to the transmission, a battery providing an energy resource for the electric motor and a fuel supply providing an energy resource for the internal combustion engine;

the controller, operating by means of fuzzy logic, comprising a measuring means for measuring the ratio in which the fuel supply and the battery are used;

a memory having a plurality of stored maps comprising a plurality of values stored therein with at least one value obtained from the measuring means;

a plurality of fuzzy rules, for use within the fuzzy logic, which relate a drive demand input signal and a powertrain speed input signal to at least one output signal where the output signal acts to control the contributions; and a set of input reference points defined for each input signal which varies over time, said sets together forming an input reference grid;

wherein said fuzzy rules are combined in such a way that an output map having output values is defined over the input reference grid, said map relating each output value to the input signals with an actual output value, corresponding to a pair of actual input signals, being found by interpolation within the output map using the input reference grid;

and the controller can adapt the maps by updating one or more of the plurality of stored values with one or more altered values, while maintaining a constant output torque, to reach a desired relationship between the contributions and then replacing the one or more stored values with said altered values.

20. A controller according to claim 19, wherein the measuring means includes an array of counters of the same dimension as the input reference grid, each counter in the array being arranged to count the number of occurrences that the corresponding input reference point is the closest point on the input reference grid to the actual input values, said occurrences being a given sampling period of time apart.

21. A method of controlling the powertrain of a hybrid electric vehicle, the powertrain having a transmission, an internal combustion engine and an electric motor which supply torque in a varying contributions to the transmission, a battery providing an energy resource for the electric motor and a fuel supply providing an energy resource for the internal combustion engine, the method comprising the steps of:

a) defining a desired relationship between the contributions of the motor and the engine;

b) measuring the ratio in which the fuel supply and the battery are used by the steps of:
  (i) defining a performance measurement function in terms of said battery current and said fuel flow rates;
  (ii) measuring an instantaneous value of said battery current;
  (iii) measuring an instantaneous value of said fuel flow rate;
  (iv) combining said instantaneous values using said performance measurement function to obtain an instantaneous value of said performance measurement function;
  (v) repeating steps (ii), (iii) and (iv) to produce a number of instantaneous values of said function; and
  (vi) combining the instantaneous values of said function to produce a moving average value of said function;

c) providing a controller to interpret and adjust the measured ratio with the aid of a plurality of stored maps, each stored map having a plurality of values stored therein; and d) adapting the maps by updating one or more of the plurality of values stored therein with one or more altered values to obtain a desired relationship between the contributions and then replacing the one or more stored values with said altered values.

22. A method according to claim 21 wherein the performance measurement function is defined by the following equation:

$$F = I_{bat} / (k_e m_f)$$

in which $I_{bat}$ is the battery current, $m_f$ is the fuel flow rate and $k_e$ is a constant that defines the equivalence of fuel and electrical energy.

23. A method according to claim 21, wherein the moving average value of the performance measurement function is updated using the following equation:

$$F_n = F_{n-1}(v-1)/v + F(1/v)$$

where $F_n$ is the moving average value of the performance measurement function, F, at time index n, the parameter v being operative for adjustment of the rate at which the moving average value of the performance measurement function is influenced by new information.

24. A method of controlling the powertrain of a hybrid electric vehicle, the powertrain having a transmission, an internal combustion engine and an electric motor which supply torque in varying contributions to the transmission, a battery providing an energy resource for the electric motor and a fuel supply providing an energy resource for the internal combustion engine, the method comprising the steps of:

a) defining a desired relationship between the contributions of the motor and the engine;

b) measuring the ratio in which the fuel supply and the battery are used by observing a fuel flow rate to the internal combustion engine and a battery current to the electric motor;

c) providing a controller to interpret and adjust the measured ratio with the aid of more than one stored maps, each stored map having a plurality of values stored therein; and d) adapting the maps by updating one or more of the plurality of values stored therein with one or more altered values to obtain a desired relationship between the contributions and then replacing the one or more stored values with said altered values.

* * * * *